(12) United States Patent
Wyers (10) Patent No.: US 7,225,649 B2
(45) Date of Patent: Jun. 5, 2007

(54) LOCKING DEVICE HAVING FLANGE SEAL

(76) Inventor: Philip W. Wyers, 14705 E. Aberdeen Ave., Centennial, CO (US) 80016

( * ) Notice: Subject to any disclaimer, the term of this patent is extended or adjusted under 35 U.S.C. 154(b) by 0 days.

(21) Appl. No.: 10/773,878

(22) Filed: Feb. 5, 2004

(65) Prior Publication Data

US 2005/0000255 A1    Jan. 6, 2005

Related U.S. Application Data

(60) Provisional application No. 60/446,055, filed on Feb. 7, 2003, now abandoned.

(51) Int. Cl.
*E05B 67/36* (2006.01)
*E05B 67/38* (2006.01)

(52) U.S. Cl. ............... 70/34; 70/50; 70/56; 70/258; 70/455

(58) Field of Classification Search ............ 70/34, 70/54–56, 423, 455, 258, 53, 50, 424, 51, 70/32, 52, DIG. 43, DIG. 56; 280/507
See application file for complete search history.

(56) References Cited

U.S. PATENT DOCUMENTS

| | | | | |
|---|---|---|---|---|
| 2,677,261 A | | 5/1954 | Jacobi ........................ 70/14 |
| 4,226,100 A | * | 10/1980 | Hampton et al. ............ 70/51 |
| 4,576,021 A | | 3/1986 | Holden ....................... 70/34 |
| 4,619,122 A | | 10/1986 | Simpson ..................... 70/34 |
| 4,651,543 A | * | 3/1987 | Heald et al. ................ 70/54 |
| 4,711,106 A | | 12/1987 | Johnson ...................... 70/34 |
| 4,946,210 A | * | 8/1990 | Fuehrer .................... 292/318 |
| 5,127,687 A | * | 7/1992 | Guiler ...................... 292/327 |
| 5,156,029 A | * | 10/1992 | Heald ......................... 70/55 |
| 5,664,445 A | | 9/1997 | Chang ........................ 70/34 |
| 5,992,187 A | * | 11/1999 | Derman ....................... 70/58 |
| 6,055,832 A | | 5/2000 | Wyers ........................ 70/34 |
| 6,209,369 B1 | * | 4/2001 | Freck ........................ 70/375 |
| 6,402,181 B1 | * | 6/2002 | Lee .......................... 280/507 |
| 6,467,316 B1 | * | 10/2002 | Chen ......................... 70/56 |
| 6,508,086 B2 | * | 1/2003 | Chen ......................... 70/49 |
| 6,543,260 B2 | * | 4/2003 | Koy et al. ................... 70/34 |
| 6,575,000 B1 | * | 6/2003 | Li ........................... 70/34 |
| 6,595,031 B2 | * | 7/2003 | Wilson et al. ............... 70/233 |
| 6,672,115 B2 | * | 1/2004 | Wyers ........................ 70/14 |
| 6,813,914 B2 | * | 11/2004 | Chen ......................... 70/50 |
| 2001/0023601 A1 | * | 9/2001 | Gilbertson et al. ........... 70/258 |

(Continued)

*Primary Examiner*—Lloyd A. Gall
(74) *Attorney, Agent, or Firm*—Timothy J. Martin; Michael R. Henson; John W. Carpenter (57) ABSTRACT

A locking device includes a shackle member that includes an elongated shank portion, a stop portion on a first end and a latch portion on a second end. A locking head includes a locking mechanism that has an entryway to receive the latch portion and is movable between a locked state to retain the latch portion and a unlock state to release the latch portion. A head cover includes a cover portion that engages the locking head and a flange portion that extends inwardly to define an opening to receive the latch portion therethrough. A seal structure is associated with the inner edge of the flange and sealably engages the outer surface margin of the latch portion. The seal structure may be a margin of the flange portion or a separate O-ring. The lock may be constructed as a lockable hitch pin.

33 Claims, 3 Drawing Sheets

U.S. PATENT DOCUMENTS

2002/0104338 A1* 8/2002 Koy et al. .................. 70/34
2002/0108407 A1* 8/2002 Zapushek .................. 70/34
2004/0211230 A1* 10/2004 Recknagel et al. ............ 70/34

* cited by examiner

LOCKING DEVICE HAVING FLANGE SEAL

FIELD OF THE INVENTION

The present invention broadly relates to locking devices that are adapted to secure objects together. More particularly, the present invention concerns key operable locking devices, such as hitch pins and the like. The present invention specifically concerns a locking device that provides a flange seal between the locking head and the shank of a shackle.

BACKGROUND OF THE INVENTION

Over the years, there have been numerous variations of locking devices from a multiple of applications. Typically, a locking device is used to secure two or more objects or members together, whether those items be independent items, a door for an enclosure, or otherwise. Moreover, a wide variety of locking mechanisms have been employed, including key actuated locks and combination locks, all of various constructions.

A widely used locking device is known as a padlock. The prior art padlock works adequately for a number of conventional applications wherein the span of objects to be secured is relatively short or where the span can be fitted with a hasp. However, numerous shortcomings of padlocks become apparent when a padlock is sought to be used in applications wherein two objects of thick cross-sections are to be secured. Examples of such conventional applications include those where telescopically joined round or square tubing members need to be secured together. Another example is where perpendicular or axially cross bolting of gates and doors require a substantially rod-like locking device.

As a result of the need for rod or elongated shackle locking devices, various devices have been developed to penetrate multiple surfaces having aligned through bores for the purpose of securing those objects together. Once such example is found in U.S. Pat. No. 2,677,261 issued May 1954 to Jacobi. The Jacobi patent, a complex locking device is taught in order to prevent actuation of a refrigerator door handle. Another example of a rod-locking device is found in U.S. Pat. No. 4,576,021 issued Mar. 18, 1986 to Holden. Holden discloses a locking rod device having a rectangular locking head that is somewhat bulky and non-symmetrical. In the Holden locking device, a radially extendable locking pin engages a circumferential opening in the latch portion of the shackle in order to retain the shackle and locking head together. The bulky nature of this lock head design, however, makes it disadvantageous in use where only limited space is available. In addition, where the locking pin is spring loaded, the locking structure of Holden is prone to false locking, that is, the engagement of the locking head and shackle without an actual locked state occurring. Thus, the locking head may fall off during use.

Several additional types of straight shackle locks have been developed wherein the latched portion of the shackle is threadably received in a screw-type lock. Examples of these locks are described in U.S. Pat. No. 4,619,122 issued Oct. 28, 1986 to Simpson as well as in U.S. Pat. No. 4,711,106 issued Dec. 8, 1987 to Johnson. These types of locks, however, tend to be inconvenient and cumbersome to use due to the threaded nature of their locked mechanisms. Specifically, the key actuable locking head described in these two patents require a large number of key rotations in order to thread and fully secure the locking head portion onto the straight shackle. The inconvenience and difficulty of threaded lock systems is compounded when the lock is located in tight or difficult to access areas. Further, the threaded screw locks are especially prone to corrosion and seizure due to the small dimensioning of the threads.

The majority of the locking structures described in the prior art fail to employ suitable seals or other structures, such as caps or protective devices to limit access of unwanted substances such as dirt and moisture into the keyway or into the locking region. In U.S. Pat. No. 5,664,445 issued Sep. 9, 1997 to Chang, a sealing ring is provided on the shackle latch portion. While the Chang patent does address the importance of limiting the access of dirt and moisture into the locked mechanism, the solution offered in the Chang patent has some drawbacks. Due to the location of the seal on the end portion of the shackle, the seal is completely exposed. Since it is of larger diameter than the shank of the shackle, the slidable engagement of the shackle through aligned bores of two objects exposes the oversized diameter of the seal to attack by the rough edges or other sharp corners of the bores due to its oversized diameter. Thus, the seal can become damaged due to the snagging or rubbing of the seal against the aligned holes.

An improvement to these structures is described in my U.S. Pat. No. 6,055,832 issued May 2, 2000. In this patent, a locking device includes a shackle member and a key operable locking head that may be fastened onto a latch portion of the shackle member. The locking head has a housing and a rotatable retainer and a lock core in the interior of the housing. The lock core is mechanically coupled to the retainer, and both the retainer and the lock core are axially oriented with respect to an axial opening in the housing. The latch portion is axially insertable through the axial opening when the lock core is in an unlocked state and has a latch head which becomes fastened by the locking head when the retainer is rotated by the lock core into a locked state. A seal is supported by the housing proximately to the axial opening and acts seal against a seal surface on the latch portion.

Despite the improvements described above in the various types of locking devices noted, there remains a need for an improved locking device having a simplified seal at an interface between the locking head and the shackle portion. There is a need for such a seal that can be conveniently manufactured with reduced costs of assembly. There is further a need for such locking devices that provide a seal in an aesthetically pleasing manner. There is a further need for such locking devices that provide a bumper-like construction so as to cushion members locked thereby. The present invention is directed to meeting such needs.

SUMMARY OF THE INVENTION

It is an object of the present invention to provide a new and useful locking device that is simple in construction and yet which provides a convenient seal between a locking head and the shackle.

It is another object of the present invention to provide a locking device that is particularly useful as a locking pin, such as a hitch pin and the like.

Still a further object of the present invention is to provide a locking device which is aesthetically pleasing yet which provides a convenient and simple seal to help insulate the locking mechanism against intrusion of foreign substances while in use.

Still a further object of the present invention is to provide an old-type locking structure having a pleasing, symmetrical appearance.

According to the present invention, then, a locking device is provided with this locking device described to be a locking hitch pin such as that used to interconnect a hitch bar to a hitch received such as would be used to interconnect a trailer vehicle to a towing vehicle. Broadly, the locking device includes a shackle member that has an elongated shank portion, a stop portion at a first end of the shank portion and a latch portion at a second end of the shank portion such that the shank portion has an outer surface margin adjacent to the latch portion. A locking head has an entryway sized and adapted to mate with the latch portion and includes a locking mechanism that is moveable between a locked state to lockably retain the latch portion therein when the latch portion is in an engaged state with the locking head at an unlocked state the release the latch portion therefrom. A head cover is provided that includes a cover portion operative to engage the locking head and a flange extending inwardly from the covered portion to define an opening having a surrounding flange edge. This opening is sized such that latch portion may be inserted into and removed from the locking head through the opening. A seal structure is associated with the edge of the flange, and the seal structure is operative when the latch portion is in the engage state to releasably engage the outer surface margin of the shank portion.

The locking mechanism is illustrated to be key operable, but other locking mechanisms, such as combination locks, are contemplated. Where the locking mechanism is key operable, the locking head has a face opposite the entryway, and a key way is provided in that face with the key way being operative to receive the key for the locking mechanism. Here, the head cover can include a cap member supported thereon, such as by a hinge piece. The cap member is moveable between an open position permitting access to the key way and a closed position wherein the cap member prohibits access to they key way. Here, the cap member can be formed integrally with the cover member.

The locking head can be formed either as a cylinder or as a frustum having a transverse inner head face, a transverse outer head face and a peripheral head surface. The cover portion of the head cover can be formed as a skirt extending around the outer head surface of the locking head. The flange then extends alongside the inner of the locking head, and the head cover can substantially encase the locking head. In one embodiment, the head cover is formed of a stiff yet resilient material. Here, the seal structure is defined by an edge margin of the flange. This edge margin can have a truncated profile. In an alternative embodiment, the edge to the flange can have a groove formed therein, and the seal structure is defined by a resilient seal member, such as an o-ring, disposed in the groove.

The shank of the shackle member may be of an elongated cylindrical configuration that extends along a central longitudinal axis. The stop portion can be formed either as a cylinder or as a frustum having a transverse inner stop face, a transverse outer stop face and a peripheral stop surface. When in the locked state, the locking head and the stop member are aligned with the shank along the central longitudinal axis.

If desired, a stop portion cover may also be provided according to the present invention. Here, the stop portion cover may substantially encase the stop portion. This stop portion cover may be formed of a stiff yet resilient material. If desired, the stop portion may have a radially inwardly projecting flange, that may be formed by an annular washer that snap locks onto this stop cover portion. This flange then extends alongside the inner stop face and, along with the flange of the head cove, can provide a resilient bumper to help reduce rattling of a hitch pin when used with a hitch bar and hitch receiver.

To this end, the present invention contemplates an improvement to a hitch that is adapted to interconnect a trailer vehicle to a towing vehicle wherein the hitch includes a hitch bar having a passageway therethrough, such as formed by opposed holes, and a hitch receiver having opposed holes. The hitch bar and hitch receiver are operative to telescopically mate together as a mated pair with the passageway of the hitch bar being aligned with the holes of the hitch receiver with the width of the hitch receiver defining a transverse dimension for the mated pair. The improvement comprises a hitch pin assembly such as that described above and in greater detail below.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is broadly directed to a locking device that is adapted to secure objects together. This device is particularly constructed so as to provide a seal between the locking head and a shank portion of the shackle. While the present invention may be employed with a variety of locking devices, it particularly concerns a locking device in the form of a pin type-locking device that is used to secure two objects together and is specifically depicted as a hitch pin that may be used to secure a hitch receiver to a hitch bar as is the common practice in towing applications. Moreover, while the present invention is described with respect to a key operable locking device, it should be understood that the invention is not limited to key operable locking devices, but the inventive concepts herein may be employed with combination-type locking mechanisms.

For illustrative purposes, the present invention is described for a locking device employing a locking mechanism such as that described in my U.S. Pat. No. 6,055,832, the disclosure of which is incorporated herein by reference. However, the present invention departs from that invention by providing a different sealing arrangement between the locking head and the shank portion of the shackle member and by providing a stop portion cover, as is hereinafter described in greater detail.

Figure 1:
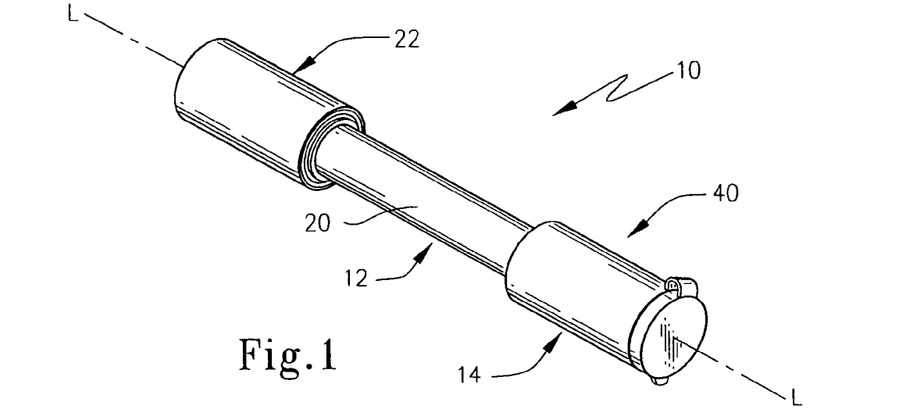
FIG. 1 is a perspective view of a locking device according to a first exemplary embodiment of the present invention.

With initial reference to FIG. 1, then, a locking device 10 is depicted which includes a shackle member 12 and a locking head 14 secured to shackle member 12 to define a fastened state. Shackle member 12 may be formed of any suitable material, although for strength, shackle member 12 may be formed of hardened steel, stainless steel, and the like, and includes a stop portion 22 at a second end opposite locking head 14. In an assembled state, as is shown again in FIG. 1, it may be seen that locking head 40, stop member 22 are aligned with shank portion 20 along the longitudinal axis "L".

Figure 2:
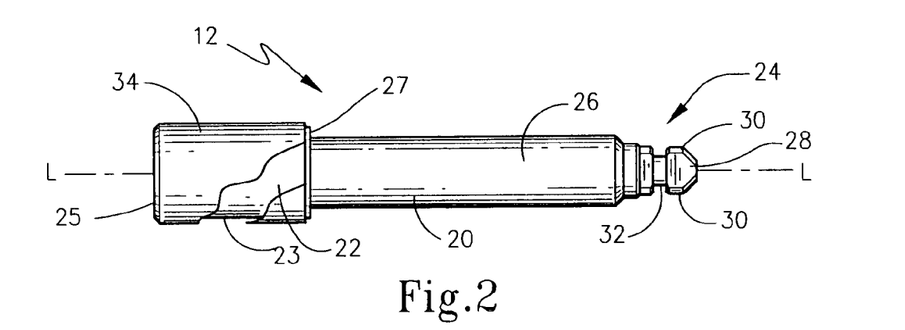
FIG. 2 is a side view in elevation, partially broken away, of the shackle member according to the exemplary embodiment of the present invention illustrated in FIG. 1.
Figure 3:
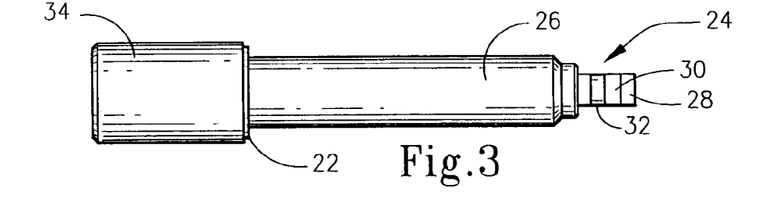
FIG. 3 is a top plan view of the shackle member of FIG. 2.
Figure 4:
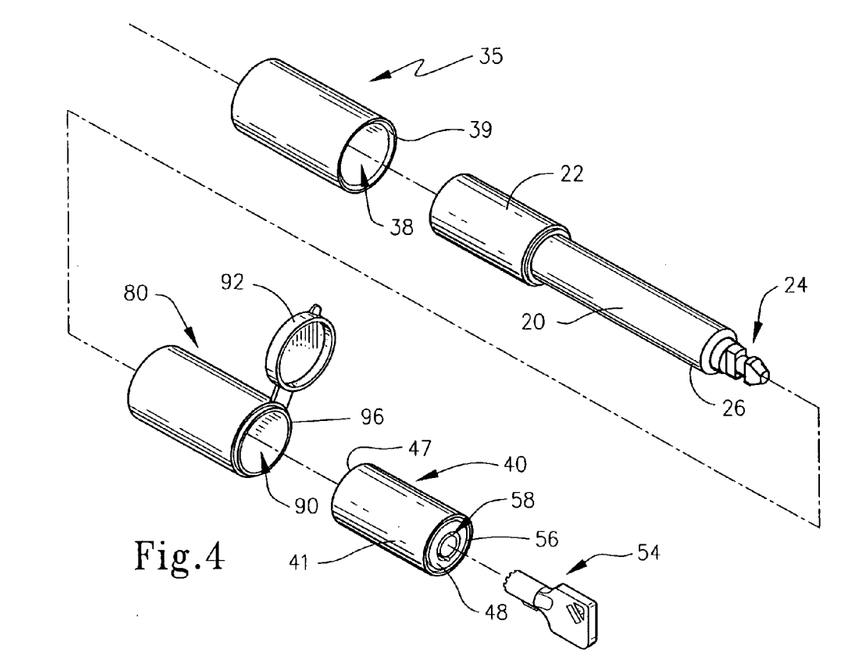
FIG. 4 is an exploded perspective view of the shackle member of FIG. 1 illustrated with a key for actuating the locking mechanism thereof.
Figures 5, 7, 8:
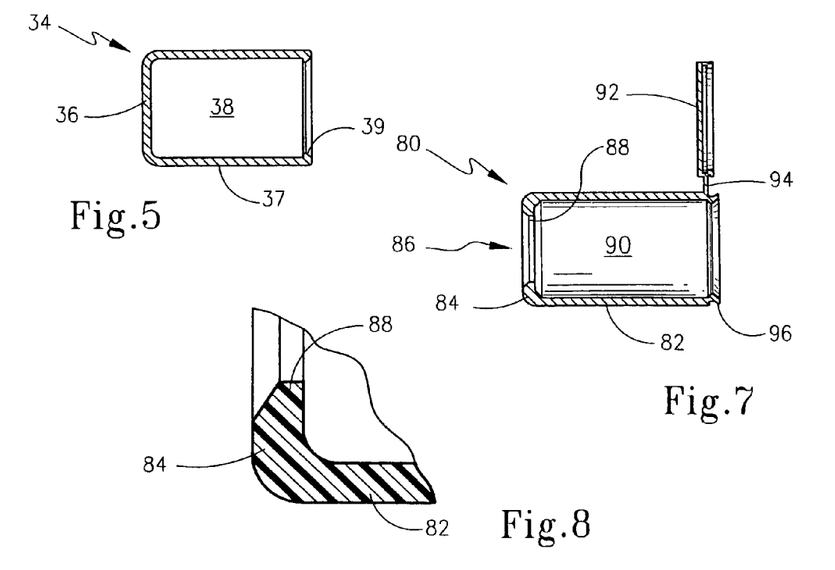
FIG. 5 is a side view in cross-section illustrating the stop portion cover introduced in FIG. 4.
FIG. 7 is a side view in cross-section of the locking head cover illustrated in FIG. 6.
FIG. 8 is an enlarged view in cross-section showing the edge of the flange portion of the locking head cover of the first exemplary embodiment.

Shackle member 12 is shown in greater detail in FIGS. 2–4. Here, shackle member 12 includes an elongated cylindrical shank 20 that has a central longitudinal axis "L". While shank portion 20 is illustrated to be cylindrical in configuration, other cross-sections are contemplated within the scope of this invention. In any event, a stop portion 22 is located at a first end of shank portion 20, and a latch portion 24 is located at a second end of shank portion 20 opposite stop portion 22. Shank portion 20 has an outer surface margin 26 adjacent to latch portion 24. Thus, margin 26 extends circumferentially around the end of shank portion 20 adjacent to latch portion 24. Stop portion 22 is illustrated to be formed as a cylindrical member, but could well be formed as a frustoconical member as illustrated in my U.S. Pat. No. 6,055,832. Thus, stop portion 22 has a peripheral stop portion surface 23, a transversely extending outer stop face 25 and a transversely extending inner stop face 27.

The construction of latch portion 22 is also the same as that described in my U.S. Pat. No. 6,055,832. Here, latch portion 24 includes latch head 28 with oppositely projecting radial lobes 30 and is supported by means of a cylindrical post 32. Latch head 28 thus defines a locking profile for mating with a locking head 40, as described more thoroughly below.

With continued reference to FIGS. 2–5, a stop portion cover 34 is sized for close-fitted mated engagement with stop portion 22 so that it substantially encases stop portion 22, as illustrated in FIGS. 2 and 3. Stop portion cover 34 includes an end wall 36 and a cylindrical surrounding side wall 37 that encloses an interior 38 which mates with stop portion 22. An edge of sidewall 37 opposite end wall 36 is provided with an inwardly projecting lip 39 in order to retain stop portion cover 34 on stop portion 22. To this end, it should be appreciated that stop portion cover 34 is formed of a stiff yet resilient material, such as plastic, rubber and the like. Stop portion cover 34 may be manufactured in any suitable manner, such as by injection molding.

As noted, latch portion 24 is adapted to engage a locking head 40. As is shown in reference to FIGS. 4 and 6, locking head 40 includes a key actuable lock mechanism 42 that can be moved between a locked state and an unlocked state. The structure of locking head 40 is again the same as that described in my U.S. Pat. No. 6,055,832, the disclosure of which has been incorporated herein by reference, but it should be understood that other locking mechanisms could be employed as well.

Figures 6, 9, 10:
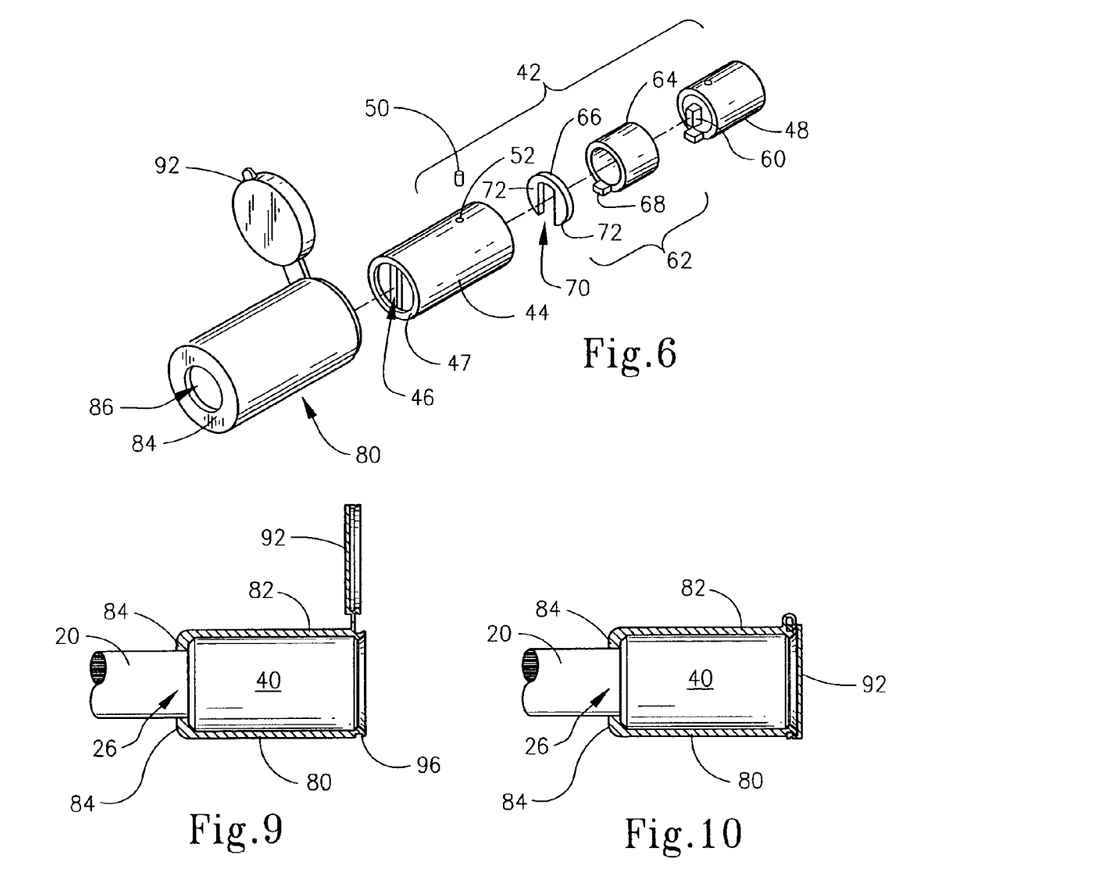
FIG. 6 is an exploded perspective view of the locking head construction introduced in FIG. 4.
FIG. 9 is a side view in partial cross-section illustrating the locking head of the first exemplary embodiment of the present invention engaging an end portion of the shackle shank so as to illustrate the seal between the locking head and the shank and with the protective cap in open position.
FIG. 10 is a side view in partial cross-section, similar to FIG. 9, but showing the cap member in a closed position.

In any event, locking mechanism 42 includes a housing 44 having a cylindrical interior and an axial opening 46 of generally rectangular cross-section sized that forms an entryway for latch portion 24. Thus, locking head 40 can receive latch portion 24 to define an engaged state. A lock core 48 may be received in the interior of housing 44 and held in position by means of a pin 50 through bore 52. Lock core 48 is key operable and is of standard construction as is known in the art so as to be actuated by a key, such as tubular key 54. Thus, locking head 40 has a peripheral head surface 41 and a transverse outer head face 56 that is opposite axial opening 46 in inner transverse head face 47, and face 56 has a keyway 58 sized for insertion of key 54 therein so that lock core 48 may be rotated relative to housing 44.

Lock core 48 includes a drive cog 60 operative to mechanically couple to a retainer 62. Accordingly, rotation of lock core 48 causes retainer 62 to move between a locked and unlocked state. Retainer 62 may have a two-piece construction, including a sleeve 64 and a C-shaped washer 66 sleeve 64 includes a prong 68. C-shaped washer 66 seats on sleeve 64 with prong 68 engaging a slot 70 between arms 72 of C-shaped washer 66. Thus, rotation of lock core 48 rotates sleeve 64 which in turn rotates C-shaped washer 66 so as to lockably retain latch portion 24 in locking head 40 when latch portion 24 is engaged therewith.

As is illustrated in FIGS. 4 and 6, locking head 40 is cylindrical in shape, but again with reference to U.S. Pat. No. 6,055,832 may be frustoconical as well. In any event, a head cover is provided for close fitted engagement with locking head 40. This head cover 80 being best illustrated in FIGS. 4, 6 and 7. Here, it may be seen that head cover 80 includes a cover portion that is operative engage a locking head. Head cover 80 may be manufactured in any suitable manner, such as by injection molding.

In this embodiment, the first cover portion is in the form of a cylindrical skirt 82 that substantially encases locking head 40, although it should be appreciated that it is not essential for this invention for skirt 82 to encase locking head 40, but rather it is only necessary that head cover 80 engage locking head 40 sufficiently to be retained thereon. A flange portion 84 extends inwardly from cover portion or skirt 82 to define an opening 86 having a surrounding flange edge 88. With brief reference to FIG. 8, it may be seen that flange edge 88 is truncated in cross-section. Thus, flange edge 88 has a trapezoidal cross-section. Head cover 80 includes an interior 90 that is sized for close fitted engagement with latch head 40 with opening 86 being sized such that latch portion 24 of shackle member 12 may be inserted into and removed from locking head 40. Head cover 80 also includes a cap member 92 that is pivotally attached to skirt 82 by means of a flexible hinge 94. Head cover 80 including cap 92 and hinge 94 may be of an integral one-piece construction, such as molded plastic and the like.

With reference to FIGS. 9 and 10, it may be seen that locking head 40 is received in head cover 80 with latch head 28 being in an engaged state therewith so that outer surface margin 26 of shank portion 20 is adjacent locking head 40. In FIG. 9, cap member 92 is in an open position, but may be moved to a closed position, as is shown in FIG. 10 wherein cap portion 92 snap locks onto a ridge 96 formed at an edge of skirt 82.

With continued reference to FIGS. 7–10, it should be appreciated that flange edge 88 in this embodiment defines a seal structure which is enhanced by its truncated cross-section. The seal structure formed by flange edge 88 is operative when latch portion 24 is in the engaged state to sealably engage the outer surface margin 26 of shank portion 20. This sealing engagement reduces the likelihood of the ingress of water and other contaminant into the lock mechanism of locking head 40. Further, cap member 92 reduces the likelihood of contamination from water, dust or other materials through keyway 58. Since head cover 80 is formed of a stiff yet resilient material, this sealing arrangement is enhanced. It should be understood, though, that the term "sealing" need not mean an absolute seal but only that which is sufficient to reasonably protect the locking mechanism of locking head 40.

Figure 11:
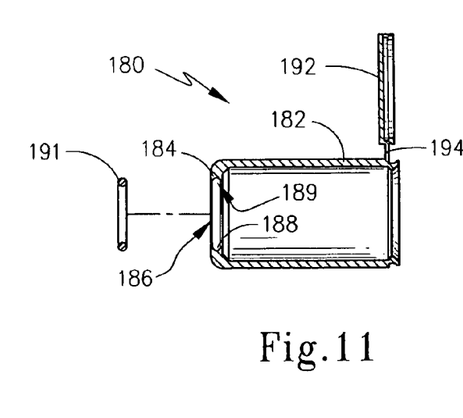
FIG. 11 is a side view in cross-section, similar to FIG. 7, but illustrating a second embodiment of the present invention utilizing an alternative seal structure.

An alternative construction for head cover 80 is illustrated in FIG. 11. Here, head cover 180 includes a skirt 182 a cap member 192 and hinge 194 and an opening 186, all similar to that described with respect to head cover 80. Here, however, head cover 180 includes a flange 184 that has a flange edge 188 provided with a groove 189 extending therearound. Groove 189 is sized and adapted to engage a resilient seal in the form of an o-ring 191. In use, head cover 180 is identical to that described with respect to head cover 80. Here, however, o-ring 191 seals against the outer surface margin 26 of shank portion 20.

Figure 12:
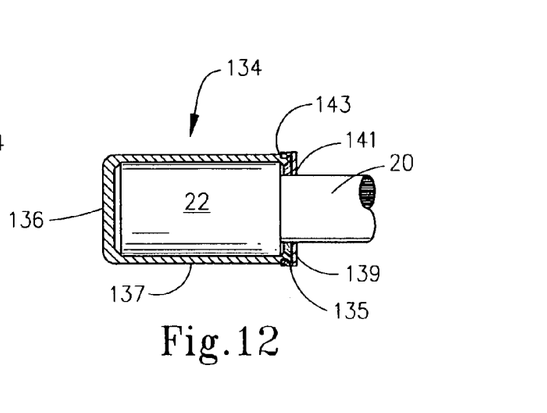
FIG. 12 is a side view in partial cross-section showing an alternative embodiment of the stop portion cover according to the present invention.

A modification to stop cover 34 is illustrated in FIG. 12. Here, stop cover 134 includes an end wall 136 a surrounding sidewall 137. An annular washer 135 snap locks onto the edge 143 of sidewall 137 opposite end wall 136. This allows stop portion 22 to be nested in the interior of stop cover 134 after which washer 135 is placed around shank portion 20 and advanced into engagement with edge 143. Annular washer 135 defines a flange 139 that projects radially inwardly a greater distance than lip 39 described with respect to stop cover 35. The inner edge 141 of the opening in annular washer 135 is therefore circumjacent the cylindrical sidewall of shank portion 20. Annular washer 139 thus forms a bumper which along with the bumper formed by either flange portion 84 or 184 of head cover 80 or 180, respectively, acts to cushion objects secured thereby on shank portion 20.

Figure 13:
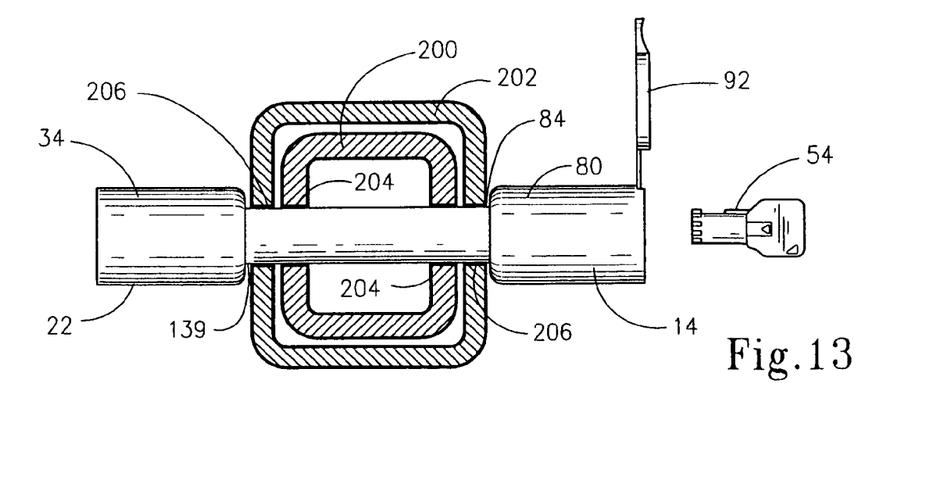
FIG. 13 is and end view in partial cross-section showing the present invention securing a hitch bar to a hitch receiver.

Such objects, as is contemplated by this invention, can be a hitch that is adapted to interconnect a trailer vehicle to a towing vehicle. In such a hitch, a hitch bar is provided that has a passageway therethrough and a hitch receiver is provided that has opposed holes, as is known in the art. This is illustrated in FIG. 13. Here, the hitch bar 200 and the hitch receiver 202 telescopically mate together as a mated pair with the passageway formed by holes 204 in hitch bar 200 aligned with the holes 206 in hitch receiver 202. The width of hitch receiver 202 thus defines a transverse dimension for the mated pair.

The present invention provides an improvement to such a hitch assembly by incorporating a hitch pin assembly that includes a shackle member, as described above. When the hitch pin locking device as above described is used to secure the hitch bar 200 to the hitch receiver 202, flange portions 84 and 139 act to cushion the movement of the hitch pin relative to the hitch bar and hitch receiver. Due to the resilient construction of head cover 80, 180 and stop portion cover 134, a dampening action is provided which tends to reduce rattling of the hitch pin.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A locking device, comprising:
(A) a shackle member including (1) an elongated shank portion having a longitudinally extending axis,
(2) a stop portion at a first end of said shank portion, and
(3) a latch portion at a second end of said shank portion, said shank portion having an outer surface margin adjacent to said latch portion;
(B) a locking head including a casing having a surrounding sidewall surface and a generally flat transverse inner head face with an entryway sized and adapted to mate with said latch portion in a longitudinal axial direction and a locking mechanism disposed in said casing, said locking mechanism being movable between
(1) a locked state to lockably retain said latch portion in said locking head when said latch portion is in an engaged state and
(2) an unlocked state to release said latch portion therefrom; and
(C) a head cover including
(1) a cover portion operative to engage the sidewall surface of said casing in surrounding relation thereto and extending therealong in the longitudinal axial direction so as to be secured thereto, and
(2) a flexible, resilient flange portion extending inwardly from said cover portion to define an opening having a surrounding flange edge that defines a seal structure, the opening being sized such that said latch portion may be inserted into and removed from said locking head through the opening with said seal structure operative when said latch portion is in the engaged state to sealably engage the outer surface margin of said shank portion.

2. A locking device according to claim 1 wherein said locking mechanism is key operable, said locking head having an outer head face opposite the inner head face with a keyway adapted to receive a key for said locking mechanism.

3. A locking device according to claim 2 wherein said head cover includes a cap member supported thereon, said cap member movable between an open position permitting access to the keyway and a closed position wherein said cap member prohibits access to the keyway.

4. A locking device according to claim 3 wherein said cap member is formed integrally with said cover portion.

5. A locking device according to claim 1 wherein said locking head is formed either as a cylinder or a frustum with a cylindrical surrounding outer head surface.

6. A locking device according to claim 5 wherein said cover portion is formed as a skirt extending around the outer head surface.

7. A locking device according to claim 1 wherein said head cover substantially encases said locking head.

8. A locking device according to claim 1 wherein an edge margin of said flange portion has a truncated profile.

9. A locking device according to claim 1 wherein said shank is an elongated linear member and extends along a central longitudinal axis.

10. A locking device according to claim 9 wherein said shank has a cylindrical configuration.

11. A locking device according to claim 9 wherein said locking head and said stop portion are aligned with said shank along said longitudinal axis.

12. A locking device according to claim 1 wherein said stop portion is formed either as a cylinder or a frustum.

13. A locking device according to claim 1 including a stop portion cover that substantially encases said stop portion.

14. A locking device according to claim 13 wherein said stop portion cover is formed of a stiff yet resilient material.

15. A locking hitch pin adapted to secure at least two members together, comprising:
(A) a shackle member including
  (1) an elongated cylindrical shank portion,
  (2) a stop portion located at a first end of said shank portion and formed as either a cylinder or a frustum and oriented coaxially with said shank portion so as to have a peripheral stop portion surface, a transversely oriented inner stop face adjacent to said shank portion and a transversely oriented outer stop face opposite said inner stop face, and
  (3) a latch portion at a second end of said shank portion, said shank portion having an outer surface margin adjacent to said latch portion;
(B) a locking head formed either as a cylinder or a frustum adapted to engage said shank to define an engaged state, said locking head having a peripheral head surface, a transversely oriented inner head face adjacent to said shank portion with an entryway sized and adapted to mate with said latch portion such that said locking head is coaxial with said shank when in the engaged state and a transversely oriented outer head face opposite said inner head face, said locking head including a locking mechanism disposed therein that is movable between
  (1) a locked state to lockably retain said latch portion in said locking head when said latch portion is in the engaged state with said locking head and
  (2) an unlocked state to release said latch portion from said locking mechanism; and
(C) a head cover including
  (1) a cylindrical or frustoconical skirt operative to extend around the peripheral head surface in confronting relation thereto so as to engage the peripheral head surface,
  (2) a first flange extending inwardly from said skirt portion alongside the inner head face and having an opening forming a surrounding flange edge, the opening being sized such that said latch portion may be inserted into and removed from said locking head through the opening, and
  (3) a seal structure associated with the edge of said first flange, said seal structure operative when said latch portion is in the engaged state to seal against the outer surface margin of said shank portion.

16. A locking hitch pin according to claim 15 wherein said locking mechanism is key operable, said outer head face provided with a keyway adapted to receive a key for said locking mechanism.

17. A locking hitch pin according to claim 16 wherein said head cover includes a cap member supported thereon, said cap member movable between an open position permitting access to the keyway and a closed position wherein said cap member engages said locking head to prohibit access to the keyway.

18. A locking hitch pin according to claim 15 wherein said head cover substantially encases said locking head.

19. A locking hitch pin according to claim 15 wherein said head cover is formed of a stiff yet resilient material, said seal structure being defined by an edge margin of said first flange.

20. A locking hitch pin according to claim 19 wherein said edge margin has a truncated profile.

21. A locking hitch pin according to claim 15 wherein the edge of said flange has a groove formed therein, said seal structure being defined by a resilient seal member disposed in the groove.

22. A locking hitch pin according to claim 21 wherein said seal member is a resilient O-ring.

23. A locking hitch pin according to claim 15 including a stop portion cover having a skirt operative to extend around at least some of the peripheral stop portion surface so as to engage said stop portion.

24. A locking hitch pin according to claim 23 wherein said stop portion cover has a second flange extending radially inwardly from said skirt alongside the inner stop face.

25. A locking hitch pin according to claim 24 wherein said stop portion cover substantially encases said stop portion.

26. A locking device according to claim 25 wherein said stop portion cover and said head cover are formed of a stiff yet resilient material such that said first and second flanges form bumpers, respectively for said locking head and said stop portion relative to the two members to be secured together thereby.

27. In a hitch adapted to interconnect a trailer vehicle to a towing vehicle including a hitch bar having a passageway therethrough and a hitch receiver having opposed holes, said hitch bar and said hitch receiver operative to telescopically mate together as a mated pair with the passageway aligned with the holes to define a transverse dimension for said mated pair, the improvement comprising a hitch pin assembly including a shackle member that has an elongated shank portion with a stop portion at a first end thereof and a latch portion at a second end thereof, said shank portion having an outer surface adjacent to said latch portion, said hitch pin assembly further including a locking head that has a surrounding sidewall surface and a generally flat transverse inner head face and a locking mechanism disposed therein and that has an entryway formed in said inner face that is sized and adapted to mate with said latch portion with the locking mechanism being movable between a locked state to lockably retain said latch portion therein when said latch portion is in an engaged state with said locking head and an unlocked state to release said latch portion therefrom, said hitch pin assembly further including a head cover that has a first cover portion operative to engage said surrounding sidewall surface of said locking head, and a flange portion extending inwardly from said cover portion to define an opening having a surrounding flange edge with the opening being sized such that said latch portion may be inserted and removed from said locking head through the opening, and a seal structure associated with the edge of said flange, mid seal structure operative when said latch portion is In the engaged state to sealably engage the outer surface of said shank portion.

28. The improvement according to claim 27 wherein said head cover substantially encases said locking head.

29. The improvement according to claim 27 wherein said head cover is formed of a stiff yet resilient material, said seal structure being defined by an edge margin of said flange.

30. The improvement according to claim 27 wherein the edge of said flange has a groove formed therein, said ml structure being defined by a resilient ml member disposed in the groove.

31. The improvement according to claim 27 including a stop portion cover that substantially encases said stop portion.

32. The improvement according to claim 31 wherein said stop portion cover is formed of a stiff yet resilient material.

33. A locking hitch pin adapted to secure at least two members together, comprising:
(A) a shackle member Including
   (1) an elongated cylindrical shank portion,
   (2) a stop portion located at a first end of said shank portion and formed as either a cylinder or a frustum and oriented coaxially with said shank portion so as to have a peripheral stop portion surface, a transversely oriented inner stop face adjacent to said shank portion and a transversely oriented outer stop face opposite said inner stop face, and
   (3) a latch portion at a second end of said shank portion, said shank portion having an outer surface margin adjacent to said latch portion;
(B) a locking head formed either as a cylinder or a frustum adapted to engage said shank to define an engaged state, said locking head having a peripheral head surface, a transversely oriented inner head face adjacent to said shank portion with an entryway sized and adapted to mate with said latch portion such that said locking head is coaxial with said shank when in the engaged state and a transversely oriented outer head face opposite said inner head face, said locking head including a locking mechanism disposed therein that is movable between
   (1) a locked state to lockably retain said latch portion in said locking head when said latch portion is in the engaged state with said locking head and
   (2) an unlocked state to release said latch portion from said locking mechanism; and
(C) a head cover including
   (1) a skirt operative to extend around and mechanically engage at least some of the peripheral head surface so as to engage said locking head,
   (2) a first flange extending inwardly from said skirt portion alongside and in confronting relationship with the inner head face and having an opening forming a surrounding flange edge, the opening being sized such that said latch portion may be inserted Into and removed from said locking head through the opening, and
(3) a seal structure associated with the edge of said first flange, said seal structure operative when said latch portion is in the engaged state to seal against the outer surface margin of said shank portion.

* * * * *